US 9,582,140 B2

(12) United States Patent
Townsend et al.

(10) Patent No.: US 9,582,140 B2
(45) Date of Patent: *Feb. 28, 2017

(54) MULTI-TOUCH OBJECT INERTIA SIMULATION

(71) Applicant: Microsoft Technology Licensing, LLC., Redmond, WA (US)

(72) Inventors: Reed L. Townsend, Kirkland, WA (US); Xiao Tu, Sammamish, WA (US); Bryan Scott, Bothell, WA (US); Todd A. Torset, Woodinville, WA (US); Kenneth W. Sykes, Moscow, ID (US); Samir S. Pradhan, Bellevue, WA (US); Jennifer A. Teed, Redmond, WA (US)

(73) Assignee: Microsoft Technology Licensing, LLC, Redwood, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/884,770

(22) Filed: Oct. 16, 2015

(65) Prior Publication Data
US 2016/0034136 A1 Feb. 4, 2016

Related U.S. Application Data

(63) Continuation of application No. 13/919,957, filed on Jun. 17, 2013, now Pat. No. 9,189,096, which is a (Continued)

(51) Int. Cl.
*G06F 3/041* (2006.01)
*G06F 3/0481* (2013.01)
(Continued)

(52) U.S. Cl.
CPC .......... *G06F 3/04812* (2013.01); *G06F 3/041* (2013.01); *G06F 3/0412* (2013.01);
(Continued)

(58) Field of Classification Search
CPC ................... G06F 3/041; G06F 3/0488; G06F 2203/04808
(Continued)

(56) References Cited

U.S. PATENT DOCUMENTS 5,153,577 A * 10/1992 Mackey ................ G06F 3/0481
345/600
5,650,941 A 7/1997 Coelho et al.
(Continued)

FOREIGN PATENT DOCUMENTS

JP 05100809 A 4/1993
JP 2005100809 A 4/2005
(Continued)

OTHER PUBLICATIONS

"Notice of Allowance Issued in Korean Patent Application No. 10-2011-7009026", Mailed Date: Nov. 18, 2015, 3 Pages. (W/o English Translation).
(Continued)

*Primary Examiner* — Prabodh M Dharia
(74) *Attorney, Agent, or Firm* — Timothy Churna; Dan Choi; Micky Minhas

(57) ABSTRACT

The inertia system provides a common platform and application-programming interface (API) for applications to extend the input received from various multi-touch hardware devices to simulate real-world behavior of application objects. To move naturally, application objects should exhibit physical characteristics such as elasticity and deceleration. When a user lifts all contacts from an object, the inertia system provides additional manipulation events to the application so that the application can handle the events as if the user was still moving the object with touch. The inertia system generates the events based on a simulation of the behavior of the objects. If the user moves an object into
(Continued)

another object, the inertia system simulates the boundary characteristics of the objects. Thus, the inertia system provides more realistic movement for application objects manipulated using multi-touch hardware and the API provides a consistent feel to manipulations across applications.

24 Claims, 7 Drawing Sheets

Related U.S. Application Data continuation of application No. 12/258,439, filed on Oct. 26, 2008, now Pat. No. 8,477,103.

(51) Int. Cl.
  G06F 3/0488 (2013.01)
  G06F 3/0484 (2013.01)
  G06F 3/0486 (2013.01)

(52) U.S. Cl.
  CPC ......... *G06F 3/0486* (2013.01); *G06F 3/0488* (2013.01); *G06F 3/04845* (2013.01); *G06F 3/04847* (2013.01); *G06F 3/04883* (2013.01); *G06F 2203/04806* (2013.01); *G06F 2203/04808* (2013.01)

(58) Field of Classification Search
  USPC ......... 345/156–174, 428, 650, 660; 715/205, 715/234, 863, 864; 178/18.05; 382/188
  See application file for complete search history.

(56) References Cited

U.S. PATENT DOCUMENTS

| | | | |
|---|---|---|---|
| 6,005,551 A | 12/1999 | Osborne et al. | |
| 6,052,735 A | 4/2000 | Ulrich et al. | |
| 6,323,846 B1 | 11/2001 | Westerman et al. | |
| 6,636,197 B1 | 10/2003 | Goldenberg et al. | |
| 7,027,054 B1* | 4/2006 | Cheiky ................. | H04N 5/262 345/473 |
| 7,324,121 B2* | 1/2008 | Young .................... | G06T 19/20 345/650 |
| 7,683,883 B2 | 3/2010 | Touma et al. | |
| 7,813,822 B1* | 10/2010 | Hoffberg ............ | G06K 9/00369 381/73.1 |
| 7,884,804 B2 | 2/2011 | Kong | |
| 7,928,959 B1 | 4/2011 | Fairs et al. | |
| 2002/0015024 A1 | 2/2002 | Westerman et al. | |
| 2005/0057579 A1* | 3/2005 | Young .................... | G06T 19/20 345/649 |
| 2005/0179674 A1 | 8/2005 | Mehrotra et al. | |
| 2006/0052885 A1 | 3/2006 | Kong | |
| 2006/0077183 A1 | 4/2006 | Studt | |
| 2006/0161871 A1 | 7/2006 | Hotelling et al. | |
| 2006/0197753 A1 | 9/2006 | Hotelling | |
| 2006/0279554 A1 | 12/2006 | Shin et al. | |
| 2007/0152984 A1 | 7/2007 | Ording et al. | |
| 2007/0157089 A1 | 7/2007 | Van Os et al. | |
| 2007/0177804 A1 | 8/2007 | Elias et al. | |
| 2007/0268269 A1 | 11/2007 | Chang et al. | |
| 2007/0291009 A1 | 12/2007 | Wright et al. | |
| 2008/0001923 A1 | 1/2008 | Hall et al. | |
| 2008/0042986 A1 | 2/2008 | Westerman et al. | |
| 2008/0163130 A1 | 7/2008 | Westerman | |
| 2008/0165141 A1 | 7/2008 | Christie | |
| 2008/0165255 A1 | 7/2008 | Christie et al. | |
| 2008/0168403 A1 | 7/2008 | Westerman et al. | |
| 2008/0180406 A1 | 7/2008 | Han et al. | |
| 2009/0040289 A1 | 2/2009 | Hetherington et al. | |
| 2009/0079745 A1* | 3/2009 | Fun ..................... | G06F 3/04815 345/474 |
| 2009/0184939 A1 | 7/2009 | Wohlstadter et al. | |
| 2009/0207175 A1 | 8/2009 | Warner | |
| 2009/0213083 A1 | 8/2009 | Dicker et al. | |
| 2009/0225037 A1 | 9/2009 | Williamson et al. | |
| 2009/0256817 A1 | 10/2009 | Perlin et al. | |
| 2009/0273560 A1 | 11/2009 | Kalanithi et al. | |
| 2010/0001998 A1* | 1/2010 | Mandella ............. | G01B 11/002 345/419 |
| 2010/0002402 A1* | 1/2010 | Rogers ................ | H01L 21/4867 361/749 |
| 2010/0079493 A1 | 4/2010 | Tse et al. | |
| 2010/0103118 A1 | 4/2010 | Townsend et al. | |
| 2011/0102464 A1* | 5/2011 | Godavari .............. | G06F 3/0416 345/650 |
| 2011/0227915 A1 | 9/2011 | Mandella et al. | |
| 2012/0038674 A1* | 2/2012 | Stergiou ................ | G06F 3/0213 345/650 |
| 2012/0208639 A1* | 8/2012 | Reynolds .............. | G06F 3/0488 463/36 |
| 2012/0256835 A1* | 10/2012 | Musick, Jr. ......... | A63F 13/2145 345/161 |
| 2013/0079152 A1* | 3/2013 | Hall ........................ | H04W 4/02 463/42 |
| 2013/0321402 A1* | 12/2013 | Moore ............... | G01C 21/3611 345/419 |

FOREIGN PATENT DOCUMENTS

| | | |
|---|---|---|
| JP | 2008508601 A | 3/2006 |
| JP | 2008516335 A | 5/2008 |
| KR | 1020090029307 A | 3/2009 |
| RU | 20080013045 A | 8/2008 |
| TW | M341271 U | 9/2008 |
| WO | 2006020305 A2 | 2/2006 |

OTHER PUBLICATIONS

"Final Office Action Issued in U.S. Appl. No. 12/258,439", Mailed Date: Sep. 18, 2012, 28 Pages.
"Non-Final Office Action Issued in U.S. Appl. No. 12/258,439", Mailed Date: May 7, 2012, 18 Pages.
"Non-Final Office Action Issued in U.S. Appl. No. 13/919,957", Mailed Dated: Sep. 19, 2013, 33 Pages.
"First Office Action Issued in Chinese Patent Application No. 200980143575.6", Mailed Date: May 28, 2013, 8 Pages.
"Notice of Allowance Issued in Chinese Patent Application No. 200980143575.6", Mailed Date: Jul. 1, 2014, 4 Pages.
"Second Office Action Issued in Chinese Patent Application No. 200980143575.6", Mailed Date: Oct. 10, 2013, 6 Pages.
"Third Office Action Issued in Chinese Patent Application No. 200980143575.6", Mailed Date: Feb. 28, 2014, 5 Pages.
"Notice of Allowance Issued in Russian Patent Application No. 2011116315", Mailed Date: Jul. 4, 2014, 16 Pages.
"Office Action Issued in Russian Patent Application No. 2011116315", Mailed Date: Sep. 20, 2013, , 4 Pages.
"Notice of Allowance Issued in Japanese Patent Application No. 2011-533249", Mailed Date: Jan. 8, 2014, 4 Pages.
"Notice of Allowance Issued in Taiwan Patent Application No. 98133607", Mailed Date: Apr. 9, 2015, 4 Pages.
"Office Action Issued in Taiwan Patent Application No. 98133607", Mailed Date: Oct. 9, 2014, 12 Pages.
"International Search Report & Written Opinion Issued in PCT Application No. PCT/US2009/060977", Mailed Date: May 31, 2010, 12 Pages.
Office Action, Argentina, Application No. P 09 01 04120, dated Jan. 28, 2016.

* cited by examiner

MULTI-TOUCH OBJECT INERTIA SIMULATION

RELATED APPLICATIONS

This application is a continuation of application Ser. No. 13/919,957, filed Jun. 17, 2013, titled "MULTI-TOUCH OBJECT INERTIA SIMULATION", and now allowed. The aforementioned application is a continuation of application Ser. No. 12/258,439, filed Oct. 26, 2008, titled "MULTI-TOUCH OBJECT INERTIA SIMULATION", and now patented.

BACKGROUND

A tablet PC, or pen computer, is a notebook or slate-shaped mobile computer, equipped with a touch screen or graphics tablet/screen hybrid technology that allows the user to operate the computer with a stylus, digital pen, or fingertip instead of a keyboard or mouse. Tablet PCs offer a more natural form of input, as sketching and handwriting are a much more familiar form of input than a keyboard and mouse, especially for people who are new to computers. Tablet PCs can also be more accessible because those who are physically unable to type can utilize the additional features of a tablet PC to be able to interact with the electronic world.

Multi-touch (or multitouch) denotes a set of interaction techniques that allow computer users to control graphical applications using multiple fingers or input devices (e.g., stylus). Multi-touch implementations usually include touch hardware (e.g., a screen, table, wall, and so on) and software that recognizes multiple simultaneous touch points. Multi-touch stands in contrast to traditional touch screens (e.g., computer touchpad, ATM, shopping kiosk) that only recognize one touch point at a time. Multi-touch hardware can sense touches using heat, finger pressure, high capture rate cameras, infrared light, optic capture, tuned electromagnetic induction, ultrasonic receivers, transducer microphones, laser rangefinders, shadow capture, and other mechanisms. Many applications for multi-touch interfaces exist and application designers and users are proposing even more. Some uses are individualistic (e.g., Microsoft Surface, Apple iPhone, HTC Diamond). As a new input method, multi-touch offers the potential for new user experience paradigms.

An application cannot use multi-touch hardware without an interface for the application software to receive information from the multi-touch hardware. Unfortunately, each multi-touch hardware device includes its own proprietary interface and application authors must have specific knowledge of a hardware device to write software that works with the device. For example, a multi-touch hardware provider may provide a kernel-mode driver and a user-mode application interface through which user-mode software applications can communicate with the multi-touch hardware to receive touch information. An application author writes software that communicates with the user-mode application interface, but the application author's software works only with that multi-touch hardware. A computer user with a different multi-touch hardware device cannot use the application author's software unless the application author produces a different version of the software that operates correctly with the computer user's device. This produces a very limited potential market for application authors, reduces the incentive to write applications supporting multi-touch interactions, and keeps the cost of the most popular devices high for which the greatest number of applications is available.

Another problem is the difficulty for applications to determine a user's intentions based on touch input received from multi-touch hardware. Touch input may be received as a list of coordinates where the hardware senses touch input at any given time. Each application has to include software to interpret the coordinates and determine the user's intention. In addition, the user's intention may extend beyond the actual touch input received. The user may expect virtual objects to behave how they do in the physical world. For example, a user may expect to be able to "toss" a file from one side of the desktop to another by flicking his/her finger. This type of movement is not supported by current multi-touch applications, which would expect the user to drag his/her finger from one side of the screen all the way to the other. Even if an application provides support for this type of movement, other applications could not benefit from it and thus application authors would have to repeat the work of the first application author to offer the same functionality in their applications.

SUMMARY

The inertia system provides a common platform and application-programming interface (API) for applications to extend the input received from various multi-touch hardware devices to simulate real-world behavior of objects. The manipulations received by the application only describe the movement of an object based on the movement of contacts with the multi-touch hardware. However, to move naturally, objects should also exhibit physical characteristics such as elasticity and deceleration. When a user lifts all contacts from an object, the inertia system provides additional manipulation events to the application so that the application can handle the events as if the user was still moving the object with touch. However, the inertia system actually generates the events based on a simulation of the behavior of the objects. If the user moves an object into another object, the inertia system sends manipulation events based on the boundary characteristics of the objects. Thus, the inertia system provides more realistic movement for application objects that a user manipulates using multi-touch hardware and the API provides a consistent feel to manipulations across applications.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
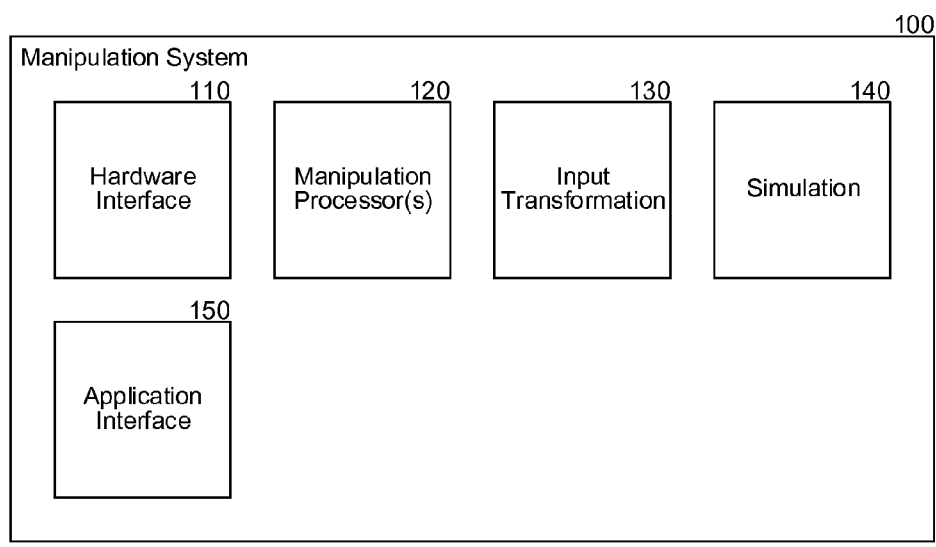
FIG. 1 is a block diagram that illustrates components of the inertia system, in one embodiment.

The inertia system provides a common platform and API for applications to extend the input received from various multi-touch hardware devices to simulate real-world behavior of objects. For example, real world objects do not typically stop moving when a user stops pushing them, but rather exhibit some inertia and keep moving until friction slows them finally to a stop. In some embodiments, the touch input first goes through a process to interpret the movement of one or more contacts as manipulations. Manipulations map more directly to user intentions than do individual touch inputs and add support for basic transformation of objects using multiple touch contacts. An application can use manipulations to support rotating, resizing, and translating multiple objects (e.g., photos) at the same time. The manipulations may be described as two-dimensional (2D) affine transforms that contain rotation, scale (e.g., zoom), and translation (e.g., pan) information.

Each touch of the multi-touch hardware is called a contact. For example, when a user sets his/her finger on the multi-touch hardware, moves his/her finger around, and lifts his/her finger, that series of events is a single contact. For example, if the user moves two contacts closer together or further apart, the system may determine that the user is scaling (e.g., zooming into or out from) an object. As another example, if the user moves multiple contacts in a circular motion, then the system may interpret the movement as a rotation of an object. Each application can define objects that are relevant differently, so it is up to the application to attach an instance of the system (called a manipulation processor) to each object that a user can manipulate using touch input within the application. For example, a photo browsing application may attach a manipulation processor to each displayed photo, so that the user can move the photos around, scale the photos, rotate the photos, and so forth.

The manipulations handled by the application only describe the movement of an object based on the movement of contacts. However, to move naturally, objects should also exhibit physical characteristics such as elasticity and deceleration. When a user lifts all contacts from an object, the inertia system provides additional manipulation events to the application so that the application can handle the events as if the user was still moving the object with touch. However, the inertia system actually generates the events based on a simulation of the behavior of the objects. For example, if the user lifted the contacts while the object had a velocity in a particular direction, then inertia system continues sending events that indicate that the object is moving in that direction, slowing down over time as the object decelerates. If the user moves an object into another object, such as the edge of the screen, the inertia system sends manipulation events based on the boundary characteristics of the objects. For example, if an application author defines two objects as being elastic, then the two objects may bounce off each other when a user moves the objects into each other. Thus, the inertia system provides more realistic movement for application objects that a user manipulates using multi-touch hardware and the API provides a consistent feel to manipulations across applications.

FIG. 1 is a block diagram that illustrates components of the inertia system, in one embodiment. The inertia system 100 includes a hardware interface 110, one or more manipulation processors 120, an input transformation component 130, a simulation component 140, and an application interface 150. Each of these components is described in further detail herein.

The hardware interface 110 communicates with the hardware to receive touch contacts and movements. The hardware interface 110 may include several subcomponents that work together to provide touch input information. For example, the operating system may provide a common driver model for multi-touch hardware manufacturers to provide touch information for their particular hardware. The operating system may translate touch information received through this model into window messages (e.g., WM_TOUCH described herein) and pass these messages to the application. Thus, the hardware interface 110 may involve the coordination of the hardware, a hardware driver, and an operating system layer. The result is a series of messages to the inertia system that identify a particular contact (e.g., touch of a finger), and the coordinates of the contact over time. For example, the operating system may provide a message when a new contact is set down on the multi-touch hardware, a message each time the contact moves, and a message when the contact is lifted away from the multi-touch hardware.

One or more manipulation processors 120 use the input transformation component 130 to interpret movement of each contact associated with a particular application object. The manipulation processor 120 may determine that a user is using multiple contacts to perform a single action. For example, a user could touch a photo with all five fingers of one hand and twist his/her hand to indicate an intention to rotate the photo. The manipulation processor 120 receives five separate contacts (one for each finger) and the change in coordinates of each contact as the user rotates his/her hand. The manipulation processor 120 determines that each contact is grabbing the same object and performing the same rotation. The system will inform the application that the user rotated the object, but the application can ignore whether the user used two, five, or any particular number of fingers or other contacts to perform the rotation. This greatly simplifies the authoring of the application because the application author can handle those types of manipulations that are relevant to the application and leave it to the inertia system to interpret the meaning of each low-level touch input received from the multi-touch hardware.

The manipulation processor 120 uses the input transformation component 130 to make determinations about the meaning of received movements of various contacts, both alone and in concert. For example, if a user is manipulating a photo with two fingers, which creates two corresponding input contacts, then the manipulation processor 120 uses the input transformation component 130 to determine the meaning of relative movements between the two contacts. If the two contacts move apart, then the input transformation component 130 may determine that the user is scaling the object to change the object's size. If the two contacts rotate, then the input transformation component 130 may determine that the user is rotating the object. If the two contacts both slide in a particular direction, then the input transformation component 130 may determine the user is panning the object to a new location. Although each type of movement is discussed separately, note that a user can make all three types of movements at the same time, and the input transformation processor can report the overall transformation to the application. For example, a user can rotate, scale, and pan an object all in one motion.

The simulation component 140 simulates the continued movement of an application object after the user stops touching the object based on initialization parameters and constraints defined for the object. An application may initialize the simulation component 140 with the final state of the manipulation processor 120 associated with the object. The application may also define various characteristics of the object, such as how the object's boundaries should behave. The simulation component 140 uses techniques based on physics to simulate the behavior of the object for a period after the user releases the object. For example, the simulation component 140 may continue to fire notifications to the application in the same form as the manipulation events received by the application while the user was moving the object. The application can then focus on reacting to the movement of the object rather than being concerned with what actions (user or physical) caused the object to move. Those of ordinary skill in the art will recognize numerous well-known techniques for simulating the equivalent physical behavior of virtual objects in software.

The application interface 150 communicates with the application to receive information and provide manipulation transforms to the application. The application interface 150 receives initialization information from the application. The initialization information may specify which types of transforms the application object supports for a particular object and associated manipulation processor as well as initialization data for the simulation component 140 when the user is no longer moving the object. For example, some application objects may support scaling but not rotation. The initialization information may also specify a pivot point of the object. The inertia system provides manipulation transforms to the application through the application interface. For example, when the inertia system receives low-level touch input that the system interprets as a recognized transform (e.g., a rotation), the system fires an event to notify the application about the manipulation. The application processes the manipulation transform to modify the object based on the transform. For example, if the user rotated the object, then the application may store the new orientation of the object to use the next time the application displays the object. As another example, if the object continued to rotate after the user released it based on calculations of the simulation component 140, then the application may store the new orientation of the object.

The computing device on which the system is implemented may include a central processing unit, memory, input devices (e.g., keyboard and pointing devices), output devices (e.g., display devices), and storage devices (e.g., disk drives). The memory and storage devices are computer-readable media that may be encoded with computer-executable instructions that implement the system, which means a computer-readable medium that contains the instructions. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

Figure 2:
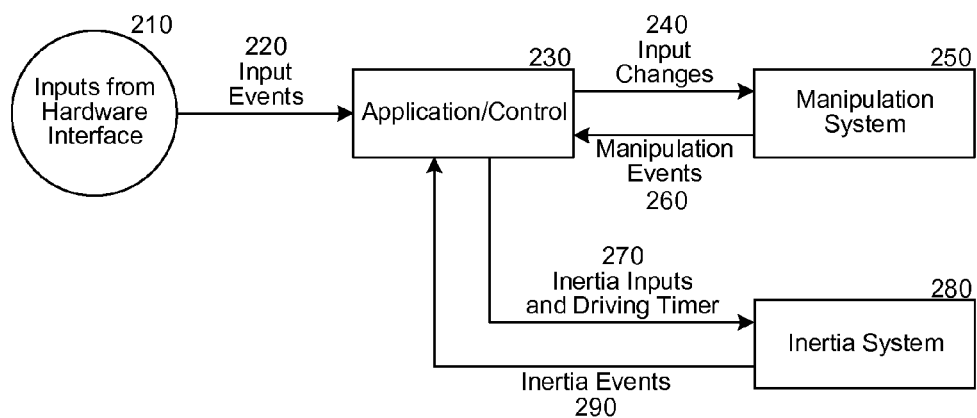
FIG. 2 is a data flow diagram that illustrates a typical operating environment of the inertia system and the flow of data between components, in one embodiment.

FIG. 2 is a data flow diagram that illustrates a typical operating environment of the inertia system and the flow of data between components, in one embodiment. A multi-touch hardware device produces inputs 210 through a hardware interface. For example, the hardware may send the inputs 210 to an operating system through a software driver provided by the hardware manufacturer. The hardware interface provides input events 220 to an application 230. For example, an application may inform the operating system that the application 230 supports multi-touch user input and register to receive messages related to multi-touch user input. The application 230 receives low-level touch input information as input changes 240 and forwards the input changes 240 to a manipulation system 250. For example, the input changes 240 may describe each movement of one or more touch contacts with the hardware using a set of coordinates that indicate each contact's current position and other movement characteristics. The manipulation system 250 interprets the input changes 240 and notifies the application 230 of one or more manipulation events 260 that indicate higher-level manipulations that the user is performing on a displayed object. For example, if the movement of the contacts indicates that the user intends to rotate the object, the manipulation events 260 indicate a degree of rotation.

When the user is done moving the object (e.g., when the application receives a notification that each contact touching an object has been removed from the touch hardware), the application 230 sends initialization information 270 to the inertia system 280. The inertia system 280 determines a next position of the object and provides inertia events 290 similar to the manipulation events 260 that the manipulation system 250 provided when the user was moving the object. The application 230 also provides a driving timer to periodically call the inertia system 280 to provide the next position of the object through inertia events 290. The application 230 processes the inertia events in a way similar to manipulation events.

Although the diagram illustrates that the application first receives touch input and passes the touch input to the manipulation system and inertia, in some embodiments, these systems receive touch input directly from the hardware interface, interpret the touch input, and provides interpreted manipulation events to the application. Likewise, the application may not know that a separate inertia system 280 provides inertia events after a user stops moving an object with touch, but rather may receive events from one interface during the time the user is moving the object and afterwards when the object is moving based on inertia. This represents an alternative architecture that provides similar resultant functionality but gives the application less control over the processing of the input. For example, the application may not be able to define individual application objects to which the system attaches individual manipulation processors. The RTS plug-in described herein is one example of this alternative architecture for the system.

Figure 3:
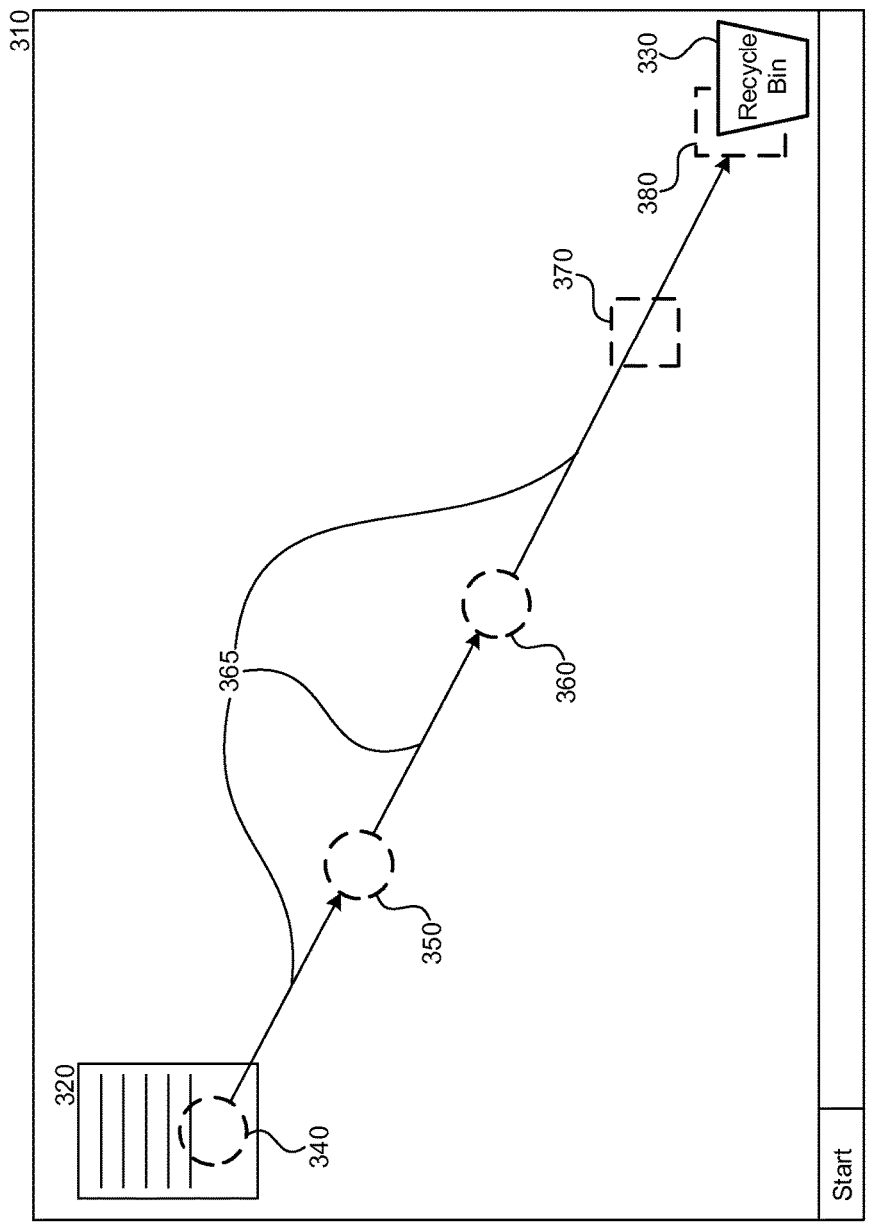
FIG. 3 is a display diagram that illustrates an application object manipulated by user touch, in one embodiment.

FIG. 3 is a display diagram that illustrates an application object manipulated by user touch, in one embodiment. An application may simultaneously display and receive touch input for many such objects. For example, an operating system shell application may display one or more document objects stored on the user's computer desktop. In the display 310, the document object 320 represents a document on the user's desktop that the user wants to drag to the recycle bin 330 using touch. The user performs a flicking motion of the document object 320 that results in system processing a first manipulation location 340, second manipulation location 350, and third manipulation location 360. The application receives the first manipulation location 340 when the user initially touches the document object 320 with one or more fingers (i.e., contacts). The application receives the second manipulation location 350 as the user slides his/her fingers across the screen. The application receives the third manipulation location when the user lifts his/her fingers from the screen. The arrows 365 represent the vectors of the document object's 320 movement.

Without inertia, the document object 320 would stop at the third manipulation location 360, which is likely not what the user intends. The inertia system provides additional manipulation locations to the application as if the user was still touching and moving the document object 320 based on the document object's 320 velocity when the user releases the document object 320. The application receives the first inertia-based manipulation location 370 when the application initializes the inertia system and calls the inertia system's processing function for the first time. The application receives the second inertia-based manipulation location 380 as the application continues to call the inertia system's processing function. Because the final manipulation location 380 of the document object 320 is over the recycle bin 330, the application processes the contact between the two objects (e.g., by placing the document object 320 in the recycle bin 330). In the example illustrated, even though the inertia system decelerates the movement of the document object 320, the document object 320 is still able to move a fair distance across the display 310 based on the high initial velocity of the user's movement of the document object 320 at the start.

Figure 4:
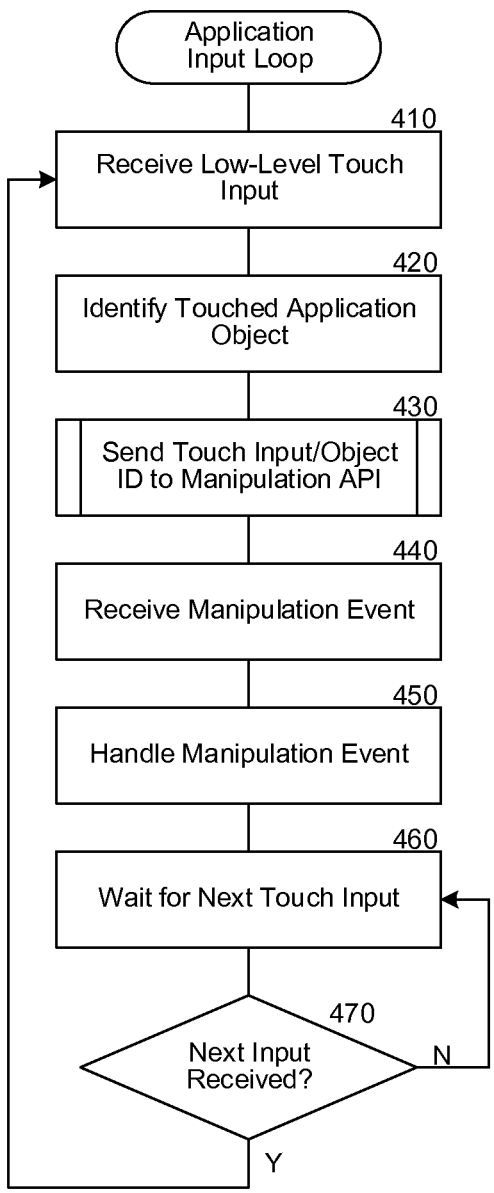
FIG. 4 is a flow diagram that illustrates the input loop processing of a multi-touch application using the inertia system to handle manipulation events, in one embodiment.

FIG. 4 is a flow diagram that illustrates the input loop processing of a multi-touch application using the inertia system to handle manipulation events, in one embodiment. In block 410, the application receives low-level touch input. For example, an operating system or instance of the inertia system receives touch contact information from multi-touch hardware and forwards the touch contact information to the application. In block 420, the application identifies the object to which the input applies. For example, the application may hit test the coordinates of the received input by comparing the coordinates with the coordinates of each application object displayed by the application. If the touch input is within the boundaries of a displayed application object, then the application determines that the touch input applies to that object. In block 430, the application sends the received touch input and the information about the identified application object to a manipulation API for invoking the inertia system (see FIG. 5). For example, the application may create a numeric identifier for each application object and pass the numeric identifier to the inertia system each time touch input corresponds to that object.

In block 440, the application receives a manipulation event from the inertia system that describes one or more manipulations of the identified application object. For example, the application may receive an event describing a 2D affine transform of the application object. Note that block 440 is illustrated serially after block 430 for simplicity of illustration. In practice, the application may receive many touch input events before the inertia system notifies the application with a manipulation event. There is not necessarily a one-to-one mapping of touch input events to manipulation events. Because manipulation events represent a higher-level interpretation of low-level touch inputs, multiple touch inputs may make up a single manipulation event. In block 450, the application handles the received manipulation event. For example, if the received manipulation event is a rotation, then the application may rotate the application object on the screen and store the application objects new location for use when the application object is displayed again. The inertia system frees the application from performing steps specific to a particular multi-touch hardware device or even from knowing which hardware device is providing the multi-touch input. In addition, the inertia system frees the application from processing individual contact movement and allows the application to focus on processing transforms at the application object level.

In block 460, the application waits for the next touch input. For example, the application may call an operating system provided message API, such as GetMessage on Microsoft Windows that waits for the next message to be delivered to the application's message queue. In decision block 470, if the application receives the next touch input, then the application loops to block 410 to process the input, else the application loops to block 460 to continue waiting for further input. When the application closes, the application exits the input loop (not shown).

Figure 5:
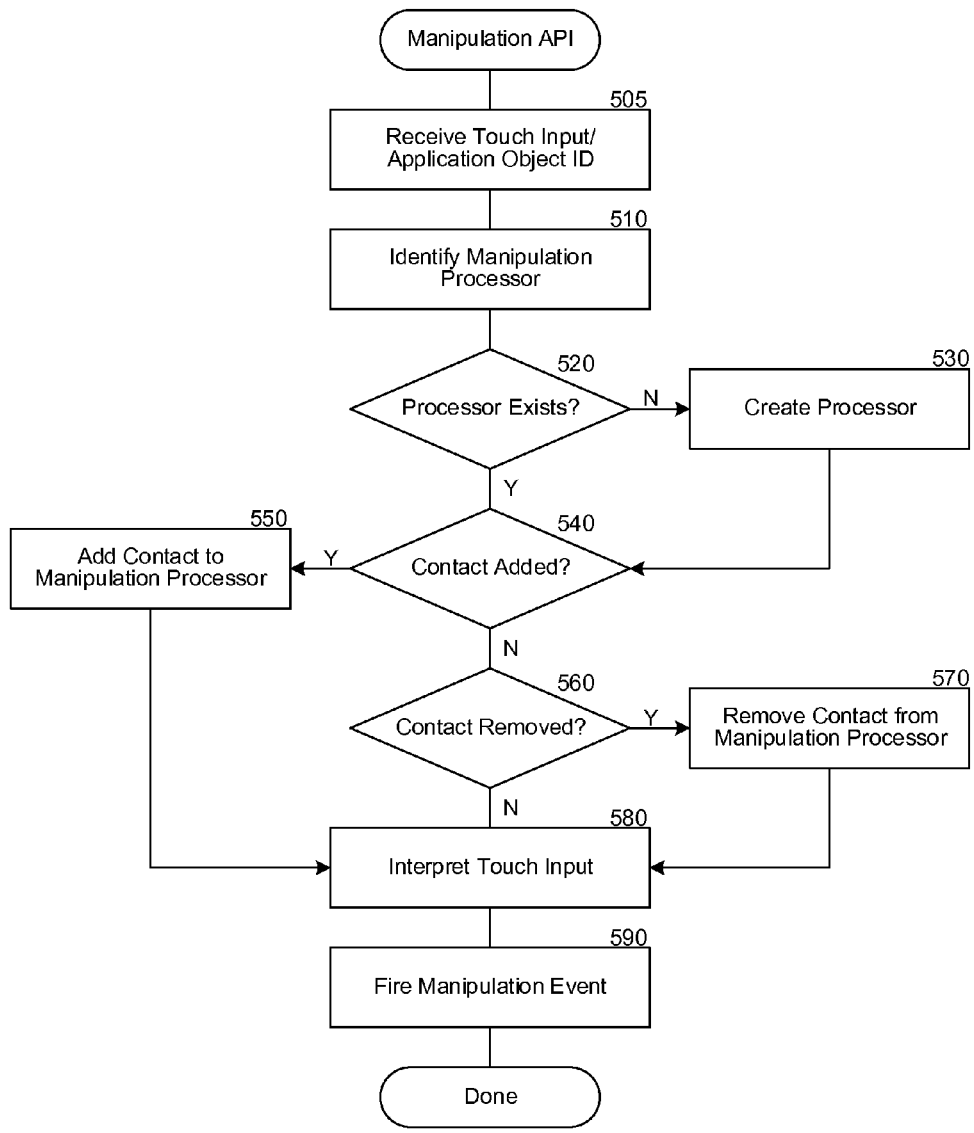
FIG. 5 is a flow diagram that illustrates the processing of the inertia system when the system receives touch input, in one embodiment.

FIG. 5 is a flow diagram that illustrates the processing of the inertia system when the system receives touch input, in one embodiment. In block 505, the system receives touch input along with information identifying an application object with which the touch input is associated. For example, the touch input may include coordinates or other location information of one or more touch contacts, and the application object information may include an identifier that the application assigned to a particular displayed object that the touch input is over on the multi-touch hardware. In block 510, the system identifies a manipulation processor associated with the application object. In decision block 520, if the system has not previously associated a manipulation processor with the application object, then the system continues at block 530, else the system continues at block 540. In block 530, the system creates a manipulation processor and associates it with the application object, then continues at block 540.

In decision block 540, if the received touch input indicates that the application received a new contact (e.g., a touch down event), then the system continues at block 550, else the system continues at block 560. For example, a user may make initial contact of a finger with an on-screen object, or set down another finger (i.e., contact) on a previously touched object. In block 550, the system adds the new contact to the list of contacts associated with the manipulation processor, and then continues at block 560. In decision block 560, if the received touch input indicates that the application received notification that a touch contact was removed (e.g., a touch up event), then the system continues at block 570, else the system continues at block 580. For example, the user may lift one or more fingers from a previously touched object. In block 570, the system removes the contact from the list of contacts associated with the manipulation processor, and then continues at block 580. In block 580, the system processes the touch input to determine any manipulations represented by the touch input. For example, touch movement may indicate a rotation or translation manipulation, while touch contact removal may indicate completion of a manipulation. In block 590, the system fires a manipulation event to send transform information describing the manipulation to the application. For example, the system may provide a degree of angular rotation of the object to the application. After block 590, these steps conclude.

Figure 6:
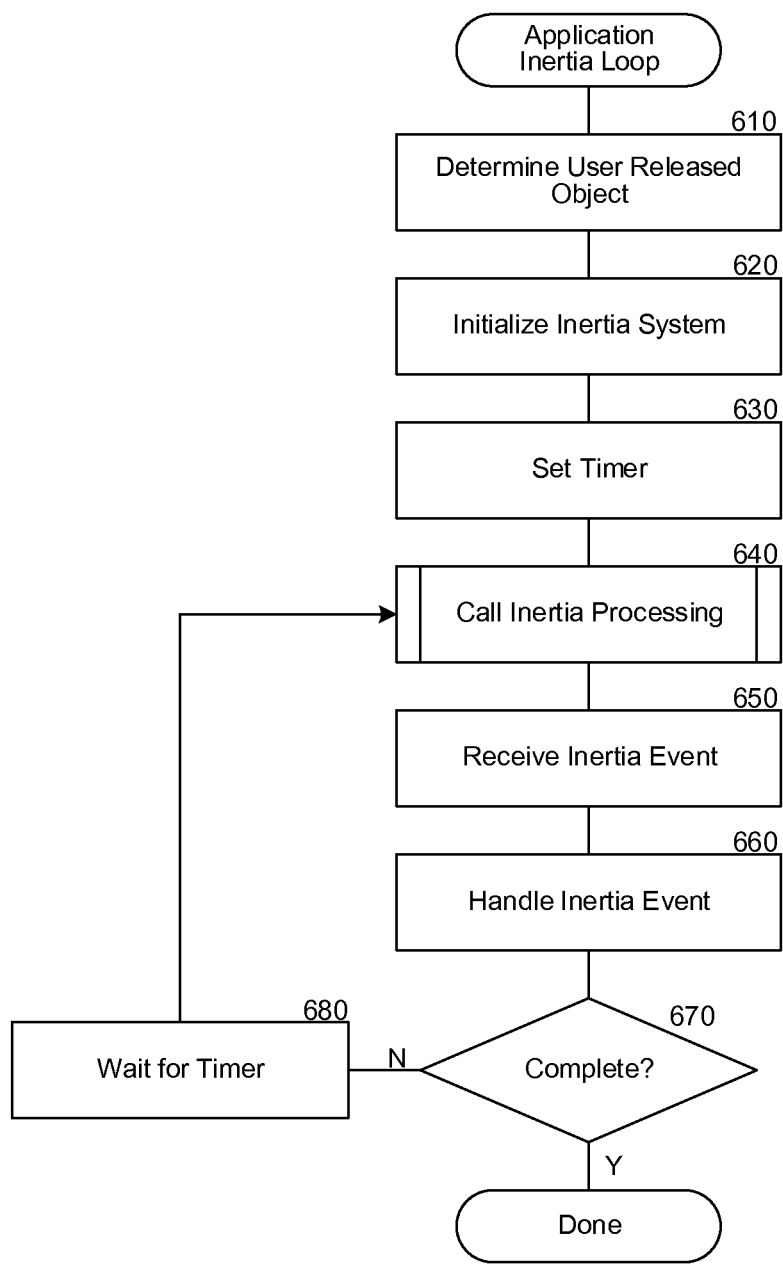
FIG. 6 is a flow diagram that illustrates the processing of a multi-touch application using the inertia system to process inertia events, in one embodiment.

FIG. 6 is a flow diagram that illustrates the processing of a multi-touch application using the inertia system to process inertia events, in one embodiment. In block 610, the application determines that the user has released an object. For example, following the handling of a manipulation event in block 450 of FIG. 4, the application may receive an indication that the manipulation is complete or that the user has lifted all contacts that were touching an application object. In block 620, the application initializes the inertia system. For example, the application may pass a reference to the manipulation processor that was handling the movement of the object and other initialization information. In block 630, the application sets a timer that will drive the inertia processing period of the inertia system. For example, the application may set a timer that will fire every 100 milliseconds to process the next movement increment of an object. In block 640, the application calls the processing function of the inertia system (see FIG. 7). For example, the inertia system may provide a "Process" function that the application calls to inform the inertia system that it is time to perform simulation for the period since the last simulation period.

In block 650, the application receives one or more inertia events that describe manipulations of the object (e.g., rotation, translation, and/or scaling) based on simulated inertia. For example, if the object was traveling in a particular direction, the application may receive an inertia event that describes a translation manipulation in that direction. As another example, if the object was expanding when the user released it, the application may receive an inertia event that describes a scaling manipulation. Note that block 650 is illustrated serially after block 640 for simplicity of illustration. In practice, the application may call the inertia processing function several times before the inertia system notifies the application with an inertia event. There is not necessarily a one-to-one mapping of calls to the processing function and inertia events. On the other hand, the inertia system may notify the application of multiple inertia events after a single call to the processing function.

In block 660, the application handles the received inertia event based on the meaning (e.g., an effect) of the manipulation in the context of the particular application. For example, if the received inertia event is a rotation, then the application may rotate the application object on the screen and store the application objects new location for use when the application displays the application object again. In decision block 670, if the inertia events are complete, then these steps conclude, else the system continues at block 680. The inertia system may inform the application that a particular simulated manipulation is complete as a return value from the process function or through the notifications provided to the application (e.g., through a Component Object Model (COM) event interface). In block 680, the application waits for the next firing of the timer, then loops to block 640 to call the inertia system processing function.

Figure 7:
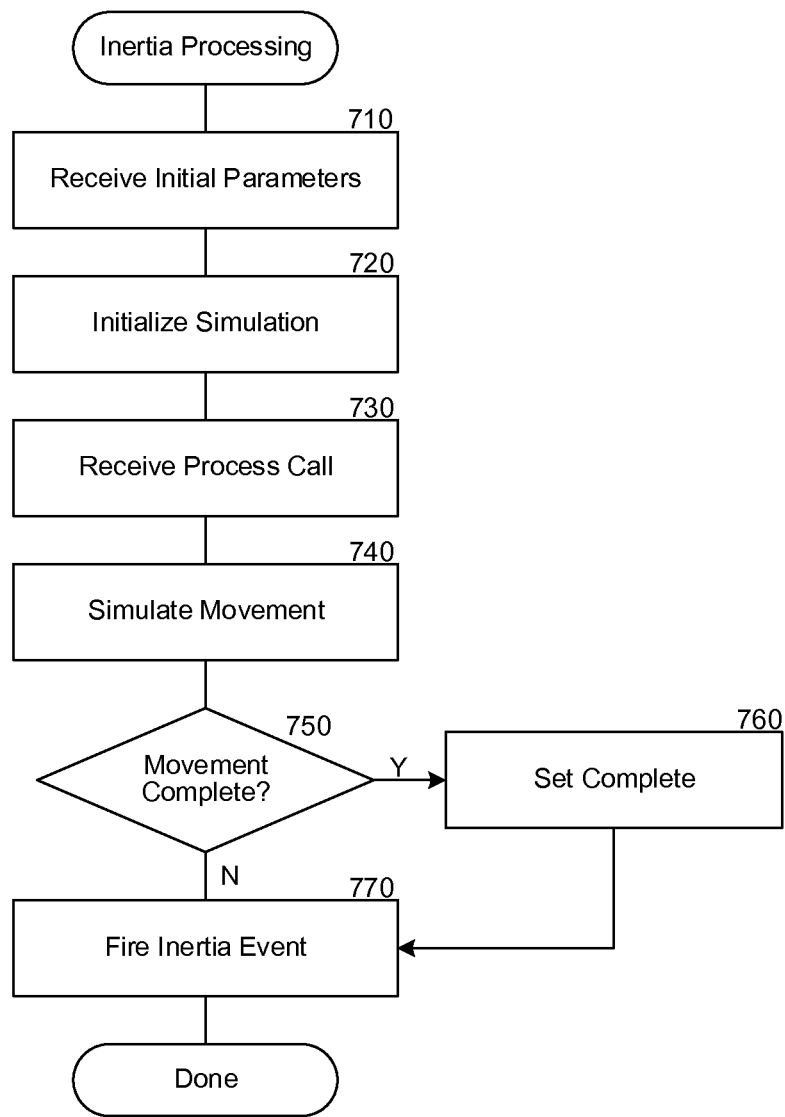
FIG. 7 is a flow diagram that illustrates the processing of the simulation component of the inertia processing system, in one embodiment.

FIG. 7 is a flow diagram that illustrates the processing of the simulation component of the inertia processing system, in one embodiment. In block 710, the component receives initial simulation parameters. For example, an application or manipulation processor may provide the final state of an application object when a user stopped touching the object. In block 720, the component initializes a simulation engine that performs calculations based on physics to determine the behavior of an object based on the parameters. For example, the simulation engine may provide realistic deceleration or elasticity behavior for application objects set in motion by user touch input. In block 730, the component receives a process call from the application. The application or other component drives the simulation process by repeatedly calling a processing function at regular intervals to move the simulation forward. The simulation component may also internally generate the timer.

In block 740, the component simulates movement of the object based on the initial parameters, any previous processing, and the time passed since the last process call. The process call may also provide a timestamp that indicates the time that the application wants the simulation to use. This allows the application to simulate application behavior in other than real-time (e.g., for application testing or debugging). In decision block 750, if the movement is complete, then the component continues at block 760, else the component continues at block 770. The component may determine that the movement is complete based on factors such as whether the object is still moving or whether the object movement has fallen below a certain threshold. In block 760, the component sets a completion flag on the next inertia event. In block 770, the component fires an inertia event to send transform information describing the current movement (e.g., as a manipulation) to the application. For example, the system may provide a degree of angular rotation of the object to the application. After block 770, these steps conclude.

In some embodiments, the inertia system receives object constraints from the application. For example, the application may define the elasticity of an object, friction coefficient (to determine how an object decelerates), boundary characteristics of the object, and so forth. For example, an application author may define rigid objects that the user can move and a bouncy application window edge, so that objects moved into the window edge bounce back from the window edge when the user releases them.

In some embodiments, the inertia system receives initial object state information from a manipulation system that was tracking the movement of the object when the user was manipulating the object with touch input. For example, the manipulation system may track the current position of each object, the historical movement of the object, the linear and angular velocity of the object, and so forth. The application author can provide the output of the manipulation to the inertia system to initialize the inertia system, so that the inertia system can smoothly continue the past movement of the object and slow it down based on appropriate physics and characteristics of the object.

In some embodiments, the inertia system receives limits on the movement of objects from the application. For example, the application author may define an upper bound on the distance that an object can move once a user releases the object. As another example, the application may define an upper bound on how long the object can move once a user releases the object. These and other limits allow the application author to adjust the inertia system to suit the types of objects manipulated by the application and to enhance the user experience with the application.

In some embodiments, the inertia system does not provide additional movement for objects with movement below a predefined threshold. The threshold may be configurable by the application. For example, the inertia system may have a particular object linear or angular velocity below which the system will not continue movement of the object after the user releases the object. If the object is not moving very fast when the user releases it, the user may expect that the object will stay put and not continue to move. The threshold allows the application or author of the inertia system to determine the level of movement after manipulation that provides a good user experience.

In some embodiments, the inertia system receives instructions to simulate movement incrementally from the application. For example, the inertia system may provide a "Process" or "DoWork" function that the application calls to instruct the inertia system to perform a portion of the overall simulation. The inertia system may expect the application to set a timer or otherwise periodically call the function to cause the inertia system to simulate movement over time according to a natural timeline. The application can affect the characteristics of the manipulation events provided by the inertia system by varying how often the application calls the function. In other embodiments, the inertia system uses an internal timer to provide manipulation events on a regular schedule until each object has stopped moving (e.g., due to deceleration or other simulated forces).

In some embodiments, the inertia system is part of a message-based operating system, and the system receives messages related to touch input that the operating system receives from the hardware. For example, using a paradigm similar to WM_MOUSEMOVE for mouse messages, future versions of Microsoft Windows may provide a WM_TOUCH message that contains low-level touch movement information received from multi-touch hardware. The operating system may also provide finer grained messages, such as WM_TOUCHDOWN (when a new contact is made with the multi-touch hardware), WM_TOUCHMOVE (when an existing contact moves), and WM_TOUCHUP (when a contact is lifted from the multi-touch hardware). An application that receives a WM_TOUCH-related message can invoke the inertia system and pass the message to the inertia system for interpretation and processing. The application then receives higher-level events that represent the inertia system's interpretation of the manipulation intended by the user based on the received low-level touch movement information.

In some embodiments, the inertia system receives low-level touch movement information from specialized hardware, such as a real-time stylus. For example, the Microsoft Tablet PC Software Development Kit (SDK) provides a real-time stylus (RTS) component that application authors can extend with hooks. RTS hooks receive input from the RTS hardware and can perform processing on the received input. The inertia system may provide a hook that an application can insert into the RTS component to automatically process RTS and other input to manipulate application objects as described herein. The RTS hook provides a different way for the inertia system to receive input, but the inertia system interprets input and fires events to the application describing manipulations implied by the input as previously described. A user may use a combination of stylus and touch input. For example, the user may draw an object with the stylus and then rotate the object using his/her fingers.

In some embodiments, the inertia system is part of a common control that an application can invoke to provide a common user interface. Microsoft Windows provides common controls for displaying lists, trees, buttons, and so forth. Likewise, the inertia system may provide a multi-touch based control for manipulating application objects in the ways described herein. For example, the system may provide a scatter control that allows the user to display one or more objects and manipulate the objects. The scatter control handles processing of low-level touch input and associating the input with a particular application object, and the application receives events from the control to handle the manipulations of the application objects. For example, if the control indicates that the user resized an object, then the application may store the objects new size.

In some embodiments, the inertia system performs the processing described herein in three dimensions. Although two-dimensional multi-touch hardware is described herein, those of ordinary skill in the art will recognize that the processing of the system described herein can be applied equally well to three-dimensional (3D) manipulations if hardware is available to provide coordinate movement in three dimensions. For example, hardware that detects pressure or uses cameras to detect 3D movement of a user's fingers could provide the coordinates of movement in the third dimension to the inertia system, and the inertia system could then produce 3D transforms that describe manipulations (e.g., rotation, scaling, and translation) of objects in multiple 3D directions.

The following table defines one API that the inertia system provides to applications for providing inertia-based movement to application objects following user touch-based movement of the objects.

| Properties: | |
|---|---|
| BoundaryBottom | Limits how far towards the bottom of the screen the target object can move. |
| BoundaryLeft | Limits how far towards the left of the screen the target object can move. |
| BoundaryRight | Limits how far towards the right of the screen the target object can move. |
| BoundaryTop | Limits how far towards the top of the screen the target object can move. |
| DesiredAngularDeceleration | Specifies the desired rate that the target object will stop spinning in radians per millisecond. |

| | |
|---|---|
| DesiredDeceleration | Specifies the desired rate at which translation operations will decelerate. |
| DesiredDisplacement | Specifies the desired distance that the object will travel. |
| DesiredExpansion | Specifies the desired change in the object's average radius. |
| DesiredExpansionDeceleration | Specifies the rate at which the object will stop expanding. |
| ElasticMarginBottom | Specifies the bottom region for bouncing the target object. |
| ElasticMarginLeft | Specifies the leftmost region for bouncing the target object. |
| ElasticMarginRight | Specifies the rightmost region for bouncing the target object. |
| InitialAngularVelocity | Specifies the rotation of the target when movement begins. |
| InitialOriginX | Gets or puts the property designating the horizontal position of a target object. This property specifies the starting horizontal location for a target with inertia. |
| InitialOriginY | Gets or puts the property designating the vertical location for a target object. This property specifies the starting vertical location for a target with inertia. |
| InitialRadius | Specifies the distance from the edge of the target to its center before the object was changed. |
| InitialTimestamp | Specifies the starting timestamp for a target object with inertia. |
| InitialVelocityX | Specifies the initial movement of the target object on the horizontal axis. |
| InitialVelocityY | Specifies the initial movement of the target object on the vertical axis. |
| Methods: | |
| HRESULT Reset( ); | Initializes the processor with initial timestamp. |
| HRESULT Process(<br>    [out] BOOL* completed<br>); | Performs calculations for the given tick and can raise the Delta or Completed event depending on whether extrapolation is completed or not. If extrapolation finished at the previous tick, the method is no-op. |
| HRESULT ProcessTime(<br>    [in] DWORD timestamp,<br>    [out] BOOL* completed<br>); | Performs calculations for the given tick and can raise the Delta or Completed event depending on whether extrapolation is completed or not. If extrapolation finished at the previous tick, the method is no-op. |
| HRESULT Complete( ); | Raises the Completed event. |
| HRESULT CompleteTime(<br>    [in] DWORD timestamp<br>); | Processes the given tick and raises the Completed event. |
| Events: | |
| HRESULT ManipulationStarted(<br>    [in] FLOAT x,<br>    [in] FLOAT y<br>); | Handles the event for when a manipulation begins. |
| HRESULT ManipulationDelta(<br>    [in] FLOAT x,<br>    [in] FLOAT y,<br>    [in] FLOAT translationDeltaX,<br>    [in] FLOAT translationDeltaY,<br>    [in] FLOAT scaleDelta,<br>    [in] FLOAT expansionDelta,<br>    [in] FLOAT rotationDelta,<br>    [in] FLOAT cumulativeTranslationX,<br>    [in] FLOAT cumulativeTranslationY,<br>    [in] FLOAT cumulativeScale,<br>    [in] FLOAT cumulativeExpansion,<br>    [in] FLOAT cumulativeRotation<br>); | Handles events that happen when a manipulated object changes |

| | |
|---|---|
| HRESULT ManipulationCompleted(<br>  [in] FLOAT x,<br>  [in] FLOAT y,<br>  [in] FLOAT cumulativeTranslationX,<br>  [in] FLOAT cumulativeTranslationY,<br>  [in] FLOAT cumulativeScale,<br>  [in] FLOAT cumulativeExpansion,<br>  [in] FLOAT cumulativeRotation<br>); | Handles the event when manipulation finishes. |

In the table above, the inertia system may provide the listed events on the same interface on which an application was previously receiving events based on user movement.

From the foregoing, it will be appreciated that specific embodiments of the inertia system have been described herein for purposes of illustration, but that various modifications may be made without deviating from the spirit and scope of the invention. For example, although the system has been described in the context of multi-touch manipulations, the system provides simulation of inertia that could be used in other contexts, such as games and other areas where simulation is commonly used. Accordingly, the invention is not limited except as by the appended claims.

The invention claimed is:

1. A method performed by a computing device, the computing device comprising processing hardware, storage hardware, and an input device, the input device configured to detect multiple concurrent input points, the method comprising:
   executing an operating system, the operating system controlling execution of an application by the processing hardware, the application comprising a graphic object, a manipulation processor, and an inertia simulator;
   receiving, from the operating system, inputs, the inputs comprising two-dimensional location information corresponding to respective input points detected by the input device and corresponding to a stroke inputted by physical contact with the input device;
   in accordance with logic of the application that links the manipulation processor with the inputs, passing the inputs from the application to the manipulation processor until the inputs are determined to have terminated;
   receiving, by the application, manipulation notifications generated by the manipulation processor, each manipulation notification comprising a respective geometric transform derived by the manipulation processor interpreting the two-dimensional location information of the inputs;
   based on a signal sent from the manipulation processor, the signal sent based on the manipulation processor determining from the inputs that the stroke has terminated, initializing the inertia simulator with initialization information that is based on motion information provided by the manipulation processor;
   applying, by the application, the geometric transforms of the manipulation notifications to the graphic object displayed by the computing device, wherein each application of a geometric transform results in display of a corresponding graphical transformation of the graphic object on the display, wherein, before the inputs terminate, the graphical transformations correspond to the inputs; and
   after the initializing, displaying the graphic object according to inertial movements computed by the inertia simulator based on the initialization information.

2. A method according to claim 1, wherein the computing device comprises an application programming interface (API) accessible to arbitrary applications executed by the operating system, and wherein the application uses the API to instantiate the manipulation processor.

3. A method according to claim 1, wherein the input device comprises a touch sensitive surface, wherein input points comprise respective identifiers, each identifier identifying a corresponding input point, wherein the input points correspond to contacts of digits with the touch sensitive surface, wherein inputs inputted by a same input point respectively comprise a same identifier of the same input point, and wherein the manipulation processor uses the identifiers to derive the geometric transforms.

4. A method according to claim 1, wherein the inertia simulator generates other manipulation notifications, wherein both the manipulation notifications generated based on the inputs and the manipulation notifications generated by the inertia simulator are received by the application through a same software interface, and wherein both the manipulation notifications generated based on the inputs and the manipulation notifications generated by the inertia simulator comprise a same notification type.

5. A method according to claim 1, wherein the application comprises a plurality of graphical objects, including the graphical object, wherein the application comprises a plurality of manipulation processors, including the manipulation processor, and wherein logic of the application determines which of the inputs are handled by which of the manipulation processors.

6. A method according to claim 1, wherein the initialization information is obtained from the manipulation processor by the inertia simulator.

7. A method according to claim 1, wherein the initializing comprises setting an initial position property of the inertia simulator to an initial position value and/or setting an initial velocity property of the inertia simulator to an initial velocity value, wherein a first geometric transform derived by the inertia simulator is based on the initial position value and/or the initial velocity value.

8. A method according to claim 7, wherein the initial position value depends on a last geometric transform derived by the manipulation processor.

9. A method according to claim 1, further comprising repeatedly invoking, by the application, a method or property of the inertia simulator to obtain the geometric transforms.

10. A method according to claim 1, wherein the motion information corresponds to physical motion detected by the input device in correspondence with termination of the stroke.

11. A computing device comprising:
a contact sensitive surface;
a display;
processing hardware;
storage hardware storing a software platform and an application;
the software platform comprising an API, the software platform accessible by arbitrary applications executing on the computing device, the software platform comprising input interpretation logic and inertia simulation logic, wherein instances of the input interpretation logic and inertia simulation logic are instantiable by the arbitrary applications using the API;
the application comprising a graphic object, the application configured to display the graphic object on the display, the application further configured to use the API to instantiate an instance of the input interpretation logic and an instance of the inertia simulation logic;
the application configured to receive points corresponding to a user's movements of a physical contact point on the contact sensitive surface;
the application configured to receive a sequence of transform events, each transform event comprising movement information, wherein the movement information in the transform events in the sequence is computed by the instance of the interpretation logic receiving, storing, and interpreting the points, and deriving from the points corresponding movement information that corresponds to physical movement of the physical contact point on the contact sensitive surface;
the application configured to move the graphic object on the display according to the movement information in the sequence of transform events; and
the application further configured to initiate inertial simulation by the instance of the inertia simulation logic with velocity information provided by the instance of the input interpretation logic, the velocity information corresponding to termination of the points, the application further configured to continue to move the graphic object on the display according to the inertial simulation of the instance of the inertia simulation logic as initialized with the velocity information.

12. A computing device according to claim 11, the application further configured to receive a notification from the inertia interpretation logic indicating cessation of further points corresponding to the physical contact point and based thereon initiate the inertial simulation.

13. A computing device according to claim 12, wherein the notification comprises a transform event, and wherein the transform event and the transform events in the sequence comprise a same event type.

14. A computing device according to claim 11, wherein the application comprises application logic that is not in the instance of the interpretation logic and that is not in the instance of the inertia simulation logic, and wherein the application logic is configured to determine that the points are associated with the graphic object and based thereon cause the instance of the interpretation logic to receive the points.

15. A computing device according to claim 14, wherein the instance of the inertia simulation logic comprises a control parameter and the instance of the inertia simulation logic is further configured such that a rate of deceleration of the inertial simulation depends on a value passed in through the control parameter.

16. A computing device according to claim 15, wherein the application is further configured to pass the value to the instance of the inertial simulation logic when initiating the inertial simulation.

17. A method according to claim 11, wherein indications of the inertia simulation are received through one or more calls to a function of the instance of the inertia simulation logic.

18. A computing device comprising:
a contact-sensitive surface;
a display;
processing hardware;
storage hardware storing instructions executable by the processing hardware of the computing device, the instructions configured to cause the processing hardware to perform a process, the process comprising:
providing a first module and a second module for an application executing on the computing device, the first module and the second module invoked through one or more APIs that are accessible to applications executing on the computing device; and
computing, by the application, affine transform events and manipulating, by the application, a graphic object displayed by the display according to the affine transform events, wherein some of the affine transform events are computed by the first module receiving and tracking locations of an input point on the contact-sensitive surface and wherein other of the affine transform events are computed by the second module simulating inertial affine transforms for the graphic object, each affine transform event comprising a translation and/or rotation and/or scale transform, wherein the locations are provided by the contact-sensitive surface sensing the input point.

19. A computing device according to claim 18, the process further comprising providing a software interface, the application receiving at least the affine transform events of the first module through the software interface.

20. A computing device according to claim 18, wherein the locations are received in messages generated by an operating system and/or a common platform of the computing device, the operating system configured to generate the messages for a mouse input device and for the contact-sensitive input surface.

21. A computing device according to claim 18, the process further comprising linking the first and second modules which causes the second module to be seeded with an initial velocity received from the first module or computed from a velocity provided by the first module.

22. A computing device according to claim 18, wherein the application is configured to listen for an event or message indicating that the input point has ended and in response initialize the second module.

23. A computing device according to claim 18, wherein the transform events computed by the second module are received through calls to a corresponding function thereof.

24. A computing device according to claim 23, wherein the calls are made by the application, and wherein the function comprises a processing function that performs the simulating of the inertial affine transforms.

* * * * *